US011540223B2

United States Patent
Butt et al.

(10) Patent No.: US 11,540,223 B2
(45) Date of Patent: Dec. 27, 2022

(54) ENERGY HARVESTING ARRIVAL AWARE JOINT SENSING AND TRANSMISSION

(71) Applicant: Nokia Technologies Oy, Espoo (FI)

(72) Inventors: Muhammad Majid Butt, Palaiseau (FR); Rapeepat Ratasuk, Inverness, IL (US); Nitin Mangalvedhe, Hoffman Estates, IL (US)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 17/729,428

(22) Filed: Apr. 26, 2022

(65) Prior Publication Data

US 2022/0346022 A1 Oct. 27, 2022

(30) Foreign Application Priority Data

Apr. 26, 2021 (FI) .................................... 20215480

(51) Int. Cl.
*H04W 52/02* (2009.01)
*H04L 1/00* (2006.01)
*H04W 52/14* (2009.01)

(52) U.S. Cl.
CPC ....... *H04W 52/0277* (2013.01); *H04L 1/0003* (2013.01); *H04W 52/146* (2013.01)

(58) Field of Classification Search
CPC ............ H04W 52/0277; H04W 52/146; H04L 1/0003
See application file for complete search history.

(56) References Cited

U.S. PATENT DOCUMENTS

| 2003/0040298 | A1  | 2/2003  | Heatley |
| 2013/0084803 | A1  | 4/2013  | Hall et al. |
| 2015/0035378 | A1* | 2/2015  | Calhoun ............... A61N 1/3785 307/104 |
| 2017/0041915 | A1  | 2/2017  | Gupta et al. |
| 2017/0332199 | A1  | 11/2017 | Elliott et al. |

(Continued)

OTHER PUBLICATIONS

Ali A, Shah GA, Arshad J. Energy Efficient Resource Allocation for M2M Devices in 5G. Sensors (Basel). 2019;19(8):1830. Published Apr. 1, 20197. doi:10.3390/s19081830.

(Continued)

*Primary Examiner* — Raymond S Dean
(74) *Attorney, Agent, or Firm* — Fay Sharpe LLP

(57) ABSTRACT

According to an aspect, there is provided an apparatus for controlling a terminal device. The apparatus monitors a current charge level of a rechargeable energy storage device of the terminal device and a current energy harvesting state of an energy harvesting device of the terminal device. When the current energy harvesting state corresponds to an energy harvesting state indicative of no energy being harvested, the apparatus causes the terminal device to operate in one of a first, second and third operating modes depending on a value of the current charge level relative to first and second thresholds. The first, second and third operating modes and the first and second thresholds are defined so that the uplink transmission functionality of the terminal device is disabled when the current charge level drops below the first threshold and the downlink transmission functionality of the terminal device is disabled when the current charge level drops below both thresholds.

18 Claims, 8 Drawing Sheets

(56) References Cited

U.S. PATENT DOCUMENTS

| | | | |
|---|---|---|---|
| 2019/0020290 A1* | 1/2019 | Feng | H02N 2/188 |
| 2019/0058242 A1* | 2/2019 | Tabe | H01Q 1/248 |
| 2019/0131825 A1* | 5/2019 | Yehezkely | G01R 19/16595 |
| 2019/0141536 A1* | 5/2019 | Bachmutsky | H04L 67/10 |
| 2019/0230594 A1 | 7/2019 | Lindoff et al. | |
| 2021/0250937 A1* | 8/2021 | Park | H04W 72/0413 |
| 2022/0103614 A1* | 3/2022 | Ganguli | H04L 67/10 |
| 2022/0158474 A1* | 5/2022 | Kitazaki | H02J 13/00001 |

OTHER PUBLICATIONS

M. Ku, W. Li, Y. Chen and K. J. Ray Liu, "Advances in Energy Harvesting Communications: Past, Present, and Future Challenges," in IEEE Communications Surveys & Tutorials, vol. 18, No. 2.
Kofi Sarpong Adu-Manu et al. Energy-Harvesting Wireless Sensor Networks (EH-WSNs): A Review, ACM Transactions on Sensor Networks vol. 14, No. 2.

\* cited by examiner

ENERGY HARVESTING ARRIVAL AWARE JOINT SENSING AND TRANSMISSION

The present application claims priority to Finland Application No. FI 20215480 filed Apr, 26, 2021.

TECHNICAL FIELD

Various example embodiments relate to wireless communications.

BACKGROUND

In 5G massive Internet of Things (IoT) use case, thousands of sensors are envisioned to be deployed in the field to perform a particular monitoring function. These sensors need to communicate with the network during operation. It is extremely important to keep functionality of these devices simple and lower their cost. Furthermore, these devices are energy limited and thus energy should be used efficiently to prolong battery life or lifetime of these devices.

Energy harvesting devices provide an alternative solution for keeping a system sustainable. Here, the goal is not to save energy as such, but to use energy in a way that it is available when needed. It is important to predict energy arrival and design transmission schedule accordingly. Energy harvesting (EH) devices (or sensors) typically are chargeable with solar energy. There may be a long gap between successive EH periods. For low cost, non-critical information gathering, devices may not be equipped with large batteries and batteries may drain for some time period every day, typically in winter.

Therefore, there is a need for solutions enabling prolonging the lifetime of such energy harvesting IoT devices in the IoT network without compromising the functionalities of the IoT device such as sensing.

US 2017332199 A1 discloses an energy storage management solution for a solar-powered tracking device.

BRIEF DESCRIPTION

According to an aspect, there is provided the subject matter of the independent claims. Embodiments are defined in the dependent claims.

One or more examples of implementations are set forth in more de-tail in the accompanying drawings and the description below. Other features will be apparent from the description and drawings, and from the claims.

Some embodiments provide an apparatus, a method, and computer readable media for energy harvesting arrival aware joint sensing and transmission.

BRIEF DESCRIPTION OF DRAWINGS

In the following, some example embodiments will be described with reference to the accompanying drawings, in which.

DETAILED DESCRIPTION OF SOME EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

In the following, different exemplifying embodiments will be described using, as an example of an access architecture to which the embodiments may be applied, a radio access architecture based on long term evolution advanced (LTE Advanced, LTE-A) or new radio (NR, 5G), without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
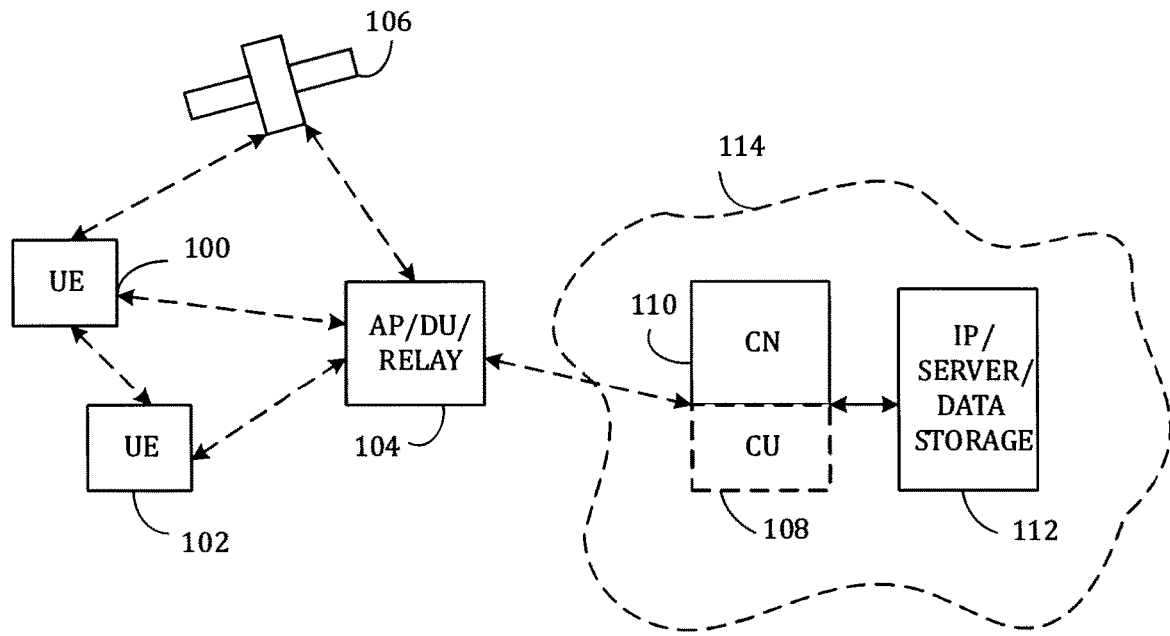
FIGS. 1 and 2 illustrate examples of communications systems to which embodiments may be applied.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 100 and 102 configured to be in a wireless connection on one or more communication channels in a cell with an access node (such as (e/g)NodeB) 104 providing the cell. The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node, host, server or access point etc. entity suitable for such a usage.

A communications system typically comprises more than one (e/g)NodeB in which case the (e/g)NodeBs may also be configured to communicate with one another over links, wired or wireless, designed for the purpose. These links may be used for signaling purposes. The (e/g)NodeB is a computing device configured to control the radio resources of communication system it is coupled to. The NodeB may also be referred to as a base station, an access point, an access node or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements (possible forming an antenna array). The (e/g)NodeB is further connected to core network 110 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal, terminal device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. The user device may also utilize cloud. In some applications, a user device may comprise a small portable device with radio parts (such as a watch, earphones or eyeglasses) and the computation is carried out in the cloud. The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT (information and communications technology) devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also being integratable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablet computers and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, or utilize services provided by them. The communication system may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NFV) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 104) and non-real time functions being carried out in a centralized manner (in a centralized unit, CU 108).

It should also be understood that the distribution of labor between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or next generation nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or IoT devices or for passengers on board of vehicles, or ensuring service availability for critical communications, and future railway/maritime/aeronautical communications. Satellite communication may utilize geostationary earth orbit (GEO) satellite systems, but also low earth orbit (LEO) satellite systems, in particular mega-constellations (systems in which hundreds of (nano)satellites are deployed). Each satellite 106 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may comprise also other apparatuses, such as physical layer relay nodes or other network elements, etc. At least one of the (e/g)NodeBs may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

Figure 2:
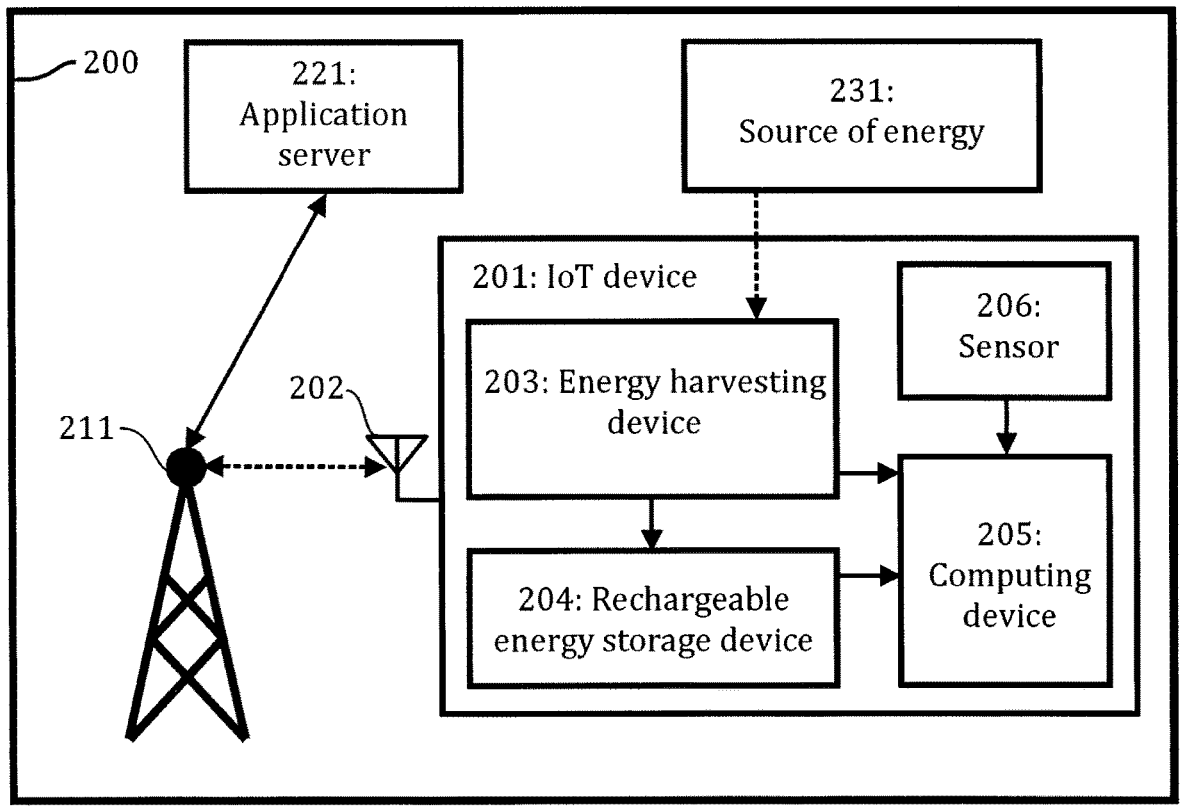

FIG. 2 illustrates another system to which embodiments may be employed. The system 200 comprises an IoT device 201 (i.e., a terminal device) for sensing, an access node 211 and an application server 221. It should be noted FIG. 2 illustrates a simplistic example of a system 200. In practice, the system 200 may comprise a plurality of access nodes and one or more IoT devices served by each of the plurality of access nodes. The IoT device 201 may form a part of an IoT or sensor network.

The system 200 of FIG. 2 may correspond to a more detailed view of the system of FIG. 1 and thus the definitions provided above may apply mutatis mutandis. To that end, the IoT device 201 may correspond to either of the terminal devices 100, 102 of FIG. 1, the access node 211 may correspond to the access node 104 of FIG. 1 and the application server 221 may correspond to the server 112 of FIG. 1.

The IoT device 201 (which may be equally called simply a terminal device) comprises at least one antenna 202 for receiving and transmitting electromagnetic waves (e.g., radio waves), an energy harvesting device 203, a rechargeable energy storage device 204, a computing device 205 and optionally a sensor 206 (or at least one sensor). Additionally, the IoT device may comprise a number of elements not explicitly illustrated in the simplified presentation of FIG. 2 such as elements or units enabling radio reception and transmission such as a transmission RF front-end, a reception RF front-end and a baseband processing unit (which may, in some embodiments, correspond to the computing device). The transmission and/or reception RF front-end(s) may comprise any elements typically found in transmission/reception RF front-ends such as one or more RF mixers, one or more low-noise amplifiers, one or more power amplifiers, one or more filters (e.g., image filter and/or intermediate frequency filter) and/or one or more local oscillators. The IoT device 201 may be configured to perform at least the following functions: receiving downlink data from the access node 211, performing sensing using said at least one sensor 206 (and/or one or more other non-communication actions) and transmitting uplink data (comprising results of sensing) to the access node 211.

In some embodiments, the IoT device 201 may be specifically a dedicated wireless sensor device (i.e., a device primarily intended for sensing or measuring potentially having relatively limited memory and/or processing power and/or energy storage capacity). Additionally or alternatively, the IoT device 201 may be specifically a reduced capability (RedCap) terminal device or a low-cost IoT device such as a Narrowband Internet of Things (NB-IoT) or Enhanced Machine Type Communication (eMTC) device. In other embodiments, the IoT device 201 may comprise no sensors.

The energy harvesting device 203 is a device capable of capturing energy from a source of energy 231 and storing it to the rechargeable energy storage device 204 and/or providing it directly for use of the IoT device 201. The source of energy 231 may be specifically a source of intermittent ambient energy, output of which may fluctuate as a function of time (e.g., throughout a given day). Depending on the type of the energy harvesting device 203 used, the source of energy 231 may be, for example, the Sun and/or other source of light and/or heat, wind, a source of kinetic energy (e.g., a hand or other body part of a user to which the IoT device is attached), a plurality of sources of RF radiation (e.g., radio transmitters) producing ambient RF radiation that can be received at the location of the IoT device 201 and/or a source of vibration. Correspondingly, the energy harvesting device 203 may be a photo-voltaic (PV) module (i.e., a solar panel) for harvesting solar energy, a (micro) wind turbine for harvesting wind energy, a thermoelectric generator for harvesting heat energy, a piezoelectric crystals or fibers for harvesting vibration or kinetic energy, a rectenna for harvesting energy from ambient RF radiation and/or an optical rectenna for harvesting energy from ambient infrared or optical radiation.

In some embodiments, the IoT device 201 may be specifically a solar sensor device for outdoor use. In such embodiments, the source of energy 231 is the Sun and the energy harvesting device 203 may be specifically a PV module. Such solar sensor devices may be used, e.g., for delay tolerant IoT traffic (e.g., reporting temperature or traffic condition). This also means they may have low priority.

The rechargeable energy storage device 204 may be a rechargeable battery. Specifically, the rechargeable energy storage device 204 may be a lithium-ion battery though other types of batteries may, alternatively, be used (e.g., a lead-acid battery, a zinc-air battery, a nickel-cadmium battery, a nickel-metal hydride battery, a Lithium Iron Phosphate battery or a lithium-ion polymer battery). The rechargeable energy storage device 204 may be connected electrically to the energy harvesting device 203.

The IoT device 201 may comprise at least one sensor 206. The at least one sensor 206 may comprise, e.g., one or more sensors selected from the following sensor types: a kinematic sensor (i.e., sensors sensing quantities associated with motion), an acoustic sensor, a humidity sensor, a temperature sensor, an air pollution sensor, a fire sensor, a smoke sensor, a gas detector, a proximity sensor, an infrared sensor, a light sensor, an ultrasonic sensor, a touch sensor, a color sensor, a tilt sensor, a video sensor and/or a flow and level sensor. The kinematic sensor(s) may comprise one or more sensors of the following types: a speed sensor, an acceleration sensor (i.e., an accelerometer), a vibration sensor, a position sensor, an angular position sensor, a displacement sensor, an angular velocity sensor (i.e., a gyro sensor), an angular acceleration sensor and a torque sensor. In some embodiments, the one or more kinematic sensors 206 may comprise two or more sensors of the same type. Each of the one or more sensors 206 of the IoT device 201 may be a built-in sensor of the IoT device 201 or an add-on to the IoT device 201.

The computing device 205 may be configured, according to embodiments to be discussed below in detail, to control sensing using said at least one sensor 206, energy harvesting, RF reception and RF transmission functionalities of the IoT device 201. The computing device may comprise at least one processor and at least one memory including computer program code, the at least one memory and computer program code being configured to, with the at least one processor, cause the computing device to perform said controlling of functionalities of the IoT device 201 according to embodiments. The computing device is discussed in further detail in connection with FIG. 7.

The IoT device 201 is connected wirelessly to an access node 211. In general, the access node 211 may serve a plurality of IoT devices 201 and/or other terminal device(s) located within a cell provided by the access node 211.

The access node provides, for the IoT device 201, a connection to an application server 221 via a core network. The connection between the access node and the application server 201 may be provided via one or more wired links and/or one or more wireless links. The application server 221 is configured to remotely manage the IoT device 201. The role of the application server 221 may vary depending on the particular embodiment. In other words, the extent of autonomous decision-making by the IoT device 201 may vary. In some embodiments, the application server 221 may be a cloud server.

In 5G massive IoT use case, thousands of sensors will be deployed in the field to perform a particular monitoring function and needs to communicate with the network. It is extremely important to keep functionality of these devices simple and lower the cost, two main focus areas for reduced capability (Redcap) UEs. Furthermore, these devices are energy limited and energy should be used efficiently to prolong battery life or lifetime of these devices.

In 5G massive IoT use case, IoT devices with energy harvesting capability such as the IoT device 201 provide means for keeping the system sustainable. Here, the goal is not to save energy as such but to use the available energy in an expedient manner. When relying on such energy harvesting-based IoT device, it is important to predict energy arrival and to design uplink and downlink transmission schedules accordingly. For example, if the IoT device is chargeable with solar energy, there is often a long gap between successive energy harvesting periods. For low cost, non-critical information gathering, the IoT devices may not be equipped with large batteries and batteries may be totally drained for a specific time period each day, especially during dark winter months. Smart agriculture, temperature and humidity monitoring are exemplary use cases for such scenarios. For these use cases,

- Monitoring uplink and downlink channels all the time may be considered a waste of resources/energy.
- Most sensors need to be continuously sensing so as not to miss a critical event, but transmission requirements may be delay tolerant, therefore energy must be preserved for sensing; and communication should be made only when necessary.
- The transmission schedule principle for the energy harvesting-based IoT devices is different from the normal terminal devices because the goal for normal terminal devices is often to use energy efficiently and achieve energy saving. The energy harvesting-based IoT devices may not necessarily operate in an optimally energy efficient manner, but, instead, may try to optimize use of energy in time domain, i.e., maximize the use of energy when available.

Therefore, the embodiments to be discussed below seek to solve the problem of prediction/knowledge of energy arrival so as to prolong the lifetime of the energy harvesting-based IoT devices (e.g., RedCap terminal devices) in the network without using large batteries, thereby reducing the size and weight of the device and lowering the cost of the device. The embodiments provide a method for delayed transmission for low cost RedCap terminal devices that prolongs lifetime of the devices in the network (without recharging batteries) and promises to save energy for the sensing part, which is an equally critical function of the IoT networks.

Figure 3A:
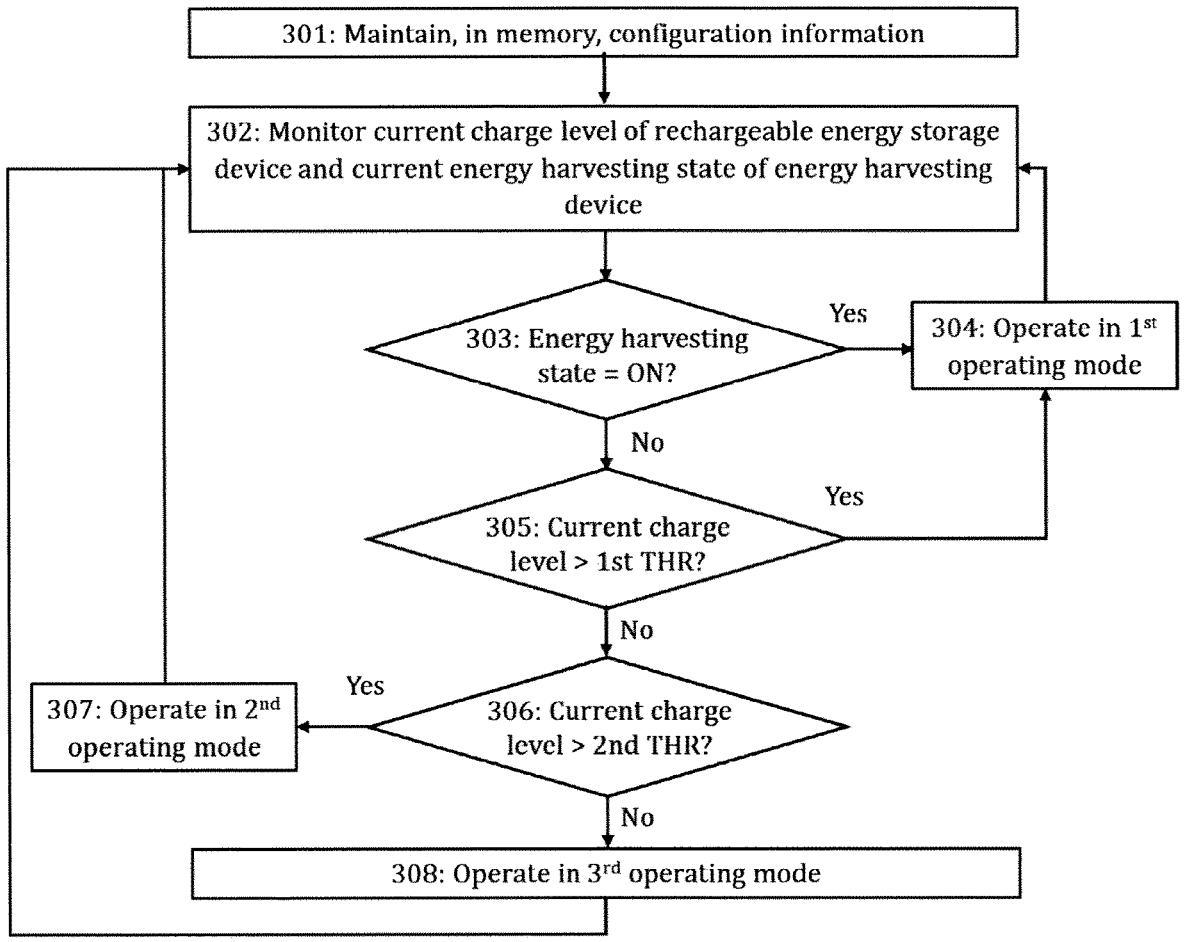
FIGS. 3A, 3B, 3C, 3D, 4A, 4B and 4C illustrate exemplary processes according to embodiments.
Figure 3B:
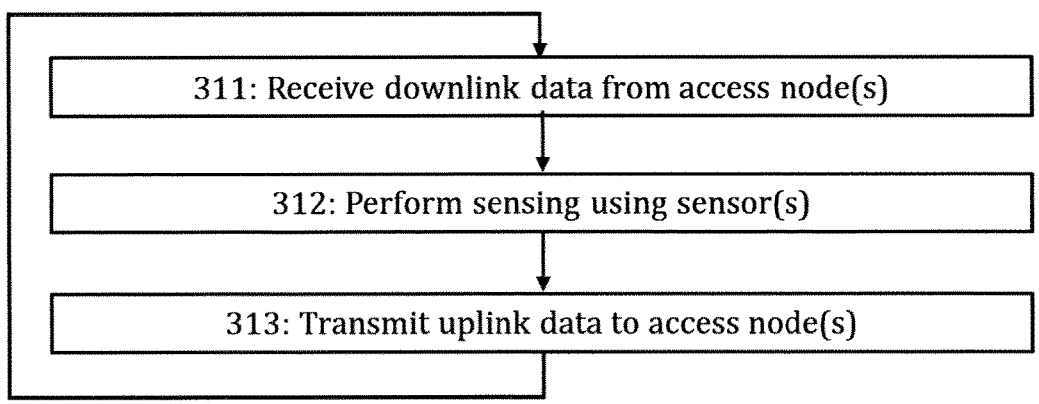
Figure 3C:
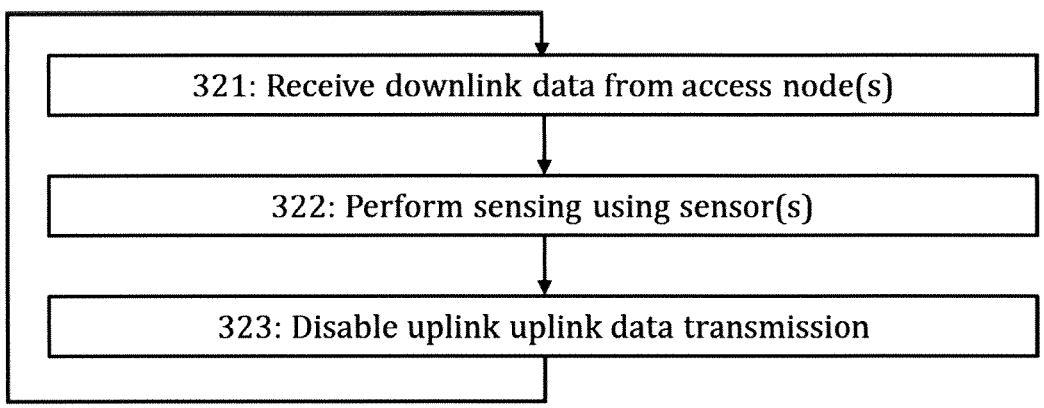
Figure 3D:
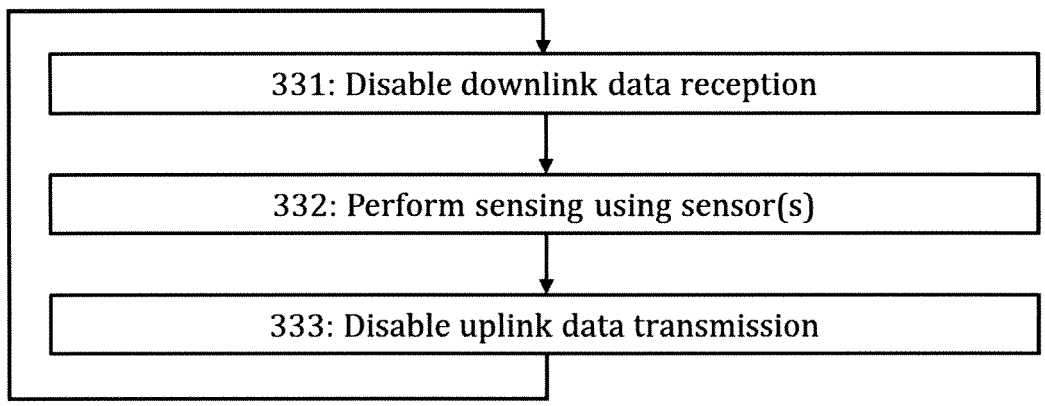

FIG. 3A illustrates a process according to embodiments for controlling operation of an energy-harvesting enabled terminal device. Specifically, FIG. 3A shows a flow chart for a process according to embodiments. Moreover, FIGS. 3B, 3C and 3D illustrate, in detail, the operation of the apparatus in first, second and third operating modes, respectively, which form a part of the more general process of FIG. 3A. The apparatus performing said process may be a computing device comprised in a terminal device such as the computing device 205 of FIG. 2. Additionally or alternatively, the apparatus may correspond to or be comprised in a terminal device such as either of the terminal devices 100, 102 of FIG. 1. Said terminal device may comprise a rechargeable energy storage device (e.g., a rechargeable battery), an energy harvesting device (e.g., a PV module) for charging the rechargeable energy storage device and at least one sensor. Said elements of the terminal device may be defined similar to as discussed in connection with FIG. 2. In the following, the device performing the process is called simply an apparatus.

Referring to FIG. 3A, the apparatus may initially maintain, in block 301, in a memory of the apparatus, configuration information defining first and second thresholds for a charge level of the rechargeable energy storage device. Instead of the maintaining in block 301, the apparatus may obtain or receive the configuration information defining the first and second thresholds (e.g., from the access node). Here, the second threshold is lower than the first threshold. The first threshold (abbreviated in FIG. 2 as "1st THR") may correspond to a threshold for a "safe" charge level (i.e., a charge level indicative of the rechargeable energy storage device not being depleted soon) while the second threshold (abbreviated in FIG. 2 as "2nd THR") may correspond to a threshold for a "critical" charge level (i.e., a charge level indicative of the depletion of the charge of the rechargeable energy storage device being imminent). The terminal device may have been configured previously to use said first and second thresholds by an access node serving the terminal device by transmitting a configuration message comprising information on said first and second thresholds from the access node to the terminal device. The transmission of the configuration message by the access node may have been triggered by the application server.

In some embodiments, the first threshold may be selected to have a value within the range 70-100% (possibly excluding the end point 100%) and/or the second threshold may be selected to have a value within the range 30-50%. Here, the percentage values correspond a charge level of the rechargeable energy storage device relative to the maximum charge level of the rechargeable energy storage device. In general, the definition of the first and second thresholds may depend on maximum capacity of the particular rechargeable energy storage device used.

The apparatus monitors, in block 302, a current charge level of the rechargeable energy storage device of the terminal device and a current energy harvesting state of the energy harvesting device of the terminal device. The energy harvesting device may be defined to have, at a time, one of two possible mutually exclusive energy harvesting states: a first energy harvesting state corresponding to an 'ON' state and a second energy harvesting state corresponding to an 'OFF' state. If the terminal device is in the first energy harvesting state, energy is harvested to the rechargeable energy storage device (i.e., the current charge level is increasing) while, if the terminal device is in the second energy harvesting state, no energy is harvested to the rechargeable energy storage device (i.e., the current charge level is decreasing or staying constant), that is, no energy is captured by the energy harvesting device or the energy captured by it is used fully for the operation of the terminal device so that nothing is left over for storing.

In some embodiments, the apparatus may monitor, in addition to or alternative to the current energy harvesting state, the amount of energy captured by the energy harvesting device (i.e., the energy harvesting rate) and at least one of the amount of captured energy stored to the rechargeable energy storage device and the amount of captured energy used by the terminal device (e.g., for sensing or transmitting).

When the current energy harvesting state corresponds to said first energy harvesting state indicative of energy being harvested to the rechargeable energy storage device in block 303, the apparatus operates, in block 304, the terminal device in a first operating mode.

The operation in the first operating mode is illustrated in FIG. 3B. The first operating mode may comprise at least functions of: receiving downlink data from at least one access node (block 311), performing sensing using said at least one sensor (block 312) and transmitting uplink data to said at least one access node (block 313). Said uplink data may specifically comprise information on results of the sensing. The downlink and/or uplink data may refer, here and in the following, specifically to user plane (or equally data plane) data. The actions pertaining to any of blocks 311 to 313 may be repeated periodically during operation in the first operating mode. When the energy harvesting device is actively harvesting energy from a source of energy (e.g., when the sun is shining on a PV module of the terminal device), there is no need to limit the operation of the terminal device and thus the first operating mode is used. Even the possibly quite energy consuming function of transmitting data in uplink direction is enabled. The so-called harvest-use-store method and/or the harvest-store method may be used for energy harvesting and using the harvested energy. These functionalities are described in more detail in connection with FIGS. 4A, 4B and 4C.

The same first operating mode may be activated in the terminal device in block 304 also when the current energy harvesting state corresponds to a second energy harvesting state indicative of no energy being harvested to the rechargeable energy storage device in block 303 and further the current charge level of the rechargeable energy storage device is higher than the first threshold in block 305. Obviously, in this case, no energy harvesting takes place while operating in the first operating mode.

In some embodiments, the terminal device in idle/inactive state may specifically initiate a connection through a random access procedure and then perform uplink data transmission in the first operating mode to an access node. The access node may recognize that the terminal device is an energy harvesting-enabled terminal device and may schedule its uplink transmissions with a high priority. Alternatively, the terminal device may perform an early data transmission procedure or transmit in previously configured resources for grant-free transmissions.

When the current energy harvesting state corresponds to the second energy harvesting state in block 303 and further the current charge level is equal to or lower than the first threshold in block 305 but higher than the second threshold in block 306, the apparatus operates, in block 307, the terminal device in a second operating mode. The operation in the second operating mode is illustrated in FIG. 3C. The second operating mode comprises at least functions of: receiving downlink data from said at least one access node (block 321), performing sensing using said at least one sensor (block 322) and disabling uplink data transmission (block 323). As mentioned above, the downlink and/or uplink data may refer here specifically to user-plane data so that the disabling in block 323 may not necessarily concern any transmission of control information. The actions pertaining to any of blocks 321 to 322 may be repeated periodically during operation in the second operating mode. Thus, due to limited but not critical charge level, the operation of the terminal device is limited in regard to uplink transmissions (usually the most energy demanding of the tasks) while the other functionalities are maintained. In practice, the uplink data transmission may be buffered in the second operating mode. Once the terminal device returns to operating in the first operating mode, any buffered uplink data transmissions may be prioritized (i.e., they may be transmitted first). This reception of uplink data by the access node acts also as an implicit signal to the access node that the terminal device is able to receive any network generated downlink data as well.

In some embodiments, the receiving of downlink data in the second operating mode (block 321) may be limited to certain pre-defined critical downlink data. In other words, only reception of non-critical downlink data is disabled.

When the current energy harvesting state corresponds to the second energy harvesting state in block 303 and the current charge level is lower than the first threshold and equal to or lower than the second threshold in blocks 305, 306, the apparatus operates, in block 308, the access node in a third operating mode. The operation in the third operating mode is illustrated in FIG. 3D. The third operating mode comprises at least functions of disabling downlink data reception (block 331), performing (periodically) sensing using said at least one sensor (block 332) and disabling uplink data transmission (block 333). Thus, compared to the second operating mode, even the downlink reception of (user-plane) data is disabled to further save energy. Sensing is typically the most critical function of the terminal device and needs to be carried out continuously. Therefore, even in this case when the charge level is critical, the sensing functionality is maintained. The sensing may be carried on until the energy stored in the rechargeable energy storage device is fully depleted.

In some embodiments, before switching to the third operating mode or immediately thereafter, a (one-time control) message or request may be sent to an access node for stopping transmission of any downlink data to the terminal device and buffer it for the 'sleeping terminal device' until further indication from the terminal device. For example, this signal could be an RRC message. As another example, the signal can be sent as an uplink control message. Subsequently, the access node will stop any ongoing data transmission and will not page the terminal device upon new data arrival. The access node may also indicate to the Access and Mobility Management Function (AMF) of the core network to buffer any associated data.

Correspondingly, when a switch from the third operating mode to the first operating mode is triggered (i.e., the current energy harvesting state changes from the OFF energy harvesting state to the ON energy harvesting state), the terminal device may transmit a (control) message or request to the access node for informing the access node that the terminal device is again capable of receiving downlink data. This message may be a previously configured random access preamble. The access node may indicate to the terminal device in Msg2 of the random access procedure (if the random access preamble is a reserved preamble) or Msg4 of the random access procedure to terminate the random access procedure if there is no downlink data to send. In some embodiments, the message may comprise information on a current energy harvesting rate and the current charge level or state.

In some embodiments, when a switch from the third operating mode to the first operating mode is triggered, the terminal device may initiate the random access procedure to send buffered or newly arrived uplink data to the access node. This also informs the access node that the terminal device is again capable of receiving downlink data.

In some embodiments, the terminal device may be configured to monitor time since last uplink transmission of certain pre-defined critical data (i.e., data of a particular type considered as critical). In such embodiments, in response to the time since last uplink transmission exceeding a pre-defined limit, the terminal device may be configured to transmit critical uplink data regardless of current operating mode. This functionality enables robustness against scenarios where inter-energy-harvesting period exceeds the expected time (e.g., during long cloudy days) and a critical data is there for uplink transmission.

While it was assumed above in connection with FIGS. 3A, 3B, 3C and 3D that the terminal device comprises at least one sensor and that the terminal device is configured to perform sensing using said at least sensor in the first, second and third operating modes in blocks 312, 322, 332, in other embodiments, the terminal device may or may not comprise any sensors. In such more general embodiments, the function of performing sensing in blocks 312, 322, 332 may be replaced with the more general function of performing one or more non-communication actions, i.e., actions not pertaining to transmission or reception of data (or specifically user-plane data). Specifically, said one or more non-communication actions may be actions which are critical for the operation of the terminal device (like sensing often is for a wireless sensor device). Similar to as discussed for the sensing functionality, the uplink transmission by the terminal device may comprise data relating to the one or more non-communication actions. Said one or more non-communication actions may comprise the sensing function discussed above, in some embodiments.

In some embodiments, block 303 may be omitted (i.e., block 302 may connect directly to block 305).

In some more general embodiments, the second operating mode may be defined to correspond to the first operating mode (as defined above) with one of its functions disabled (e.g., the uplink transmissions disabled, as discussed above) and the third operating mode may be defined to correspond to the second operating mode with at least one further function disabled (e.g., downlink reception disabled in addition to disabling of uplink transmissions, as discussed above).

In some alternative embodiments, the apparatus performing the process of FIG. 3A may be an application server communicatively connected to the terminal device via at least one access node (e.g., the application server 221 of FIG. 2 and/or the server 112 of FIG. 1), as opposed to any device comprised in the terminal device. In such embodiments, the performing of the monitoring in block 302 may correspond to receiving at least one control message comprising the current charge level and the current energy harvesting state from the terminal device via the access node. The terminal device may be configured to report the current charge level and the current energy harvesting state to the application server periodically or regularly. This reporting corresponds to control information not affected by the disabling of data transmission in blocks 323, 333. Moreover, the causing operation of the terminal device in first, second or third operating mode in blocks 304, 307, 308 may correspond to transmitting, via the access node to the terminal device, at least one control message for requesting a change of an operating mode of the terminal device to the first, second or third operating mode, respectively. These control messages are also not affected by disabling of the downlink data reception in block 331. These functionalities are further discussed in connection with FIG. 6.

Figure 4A:
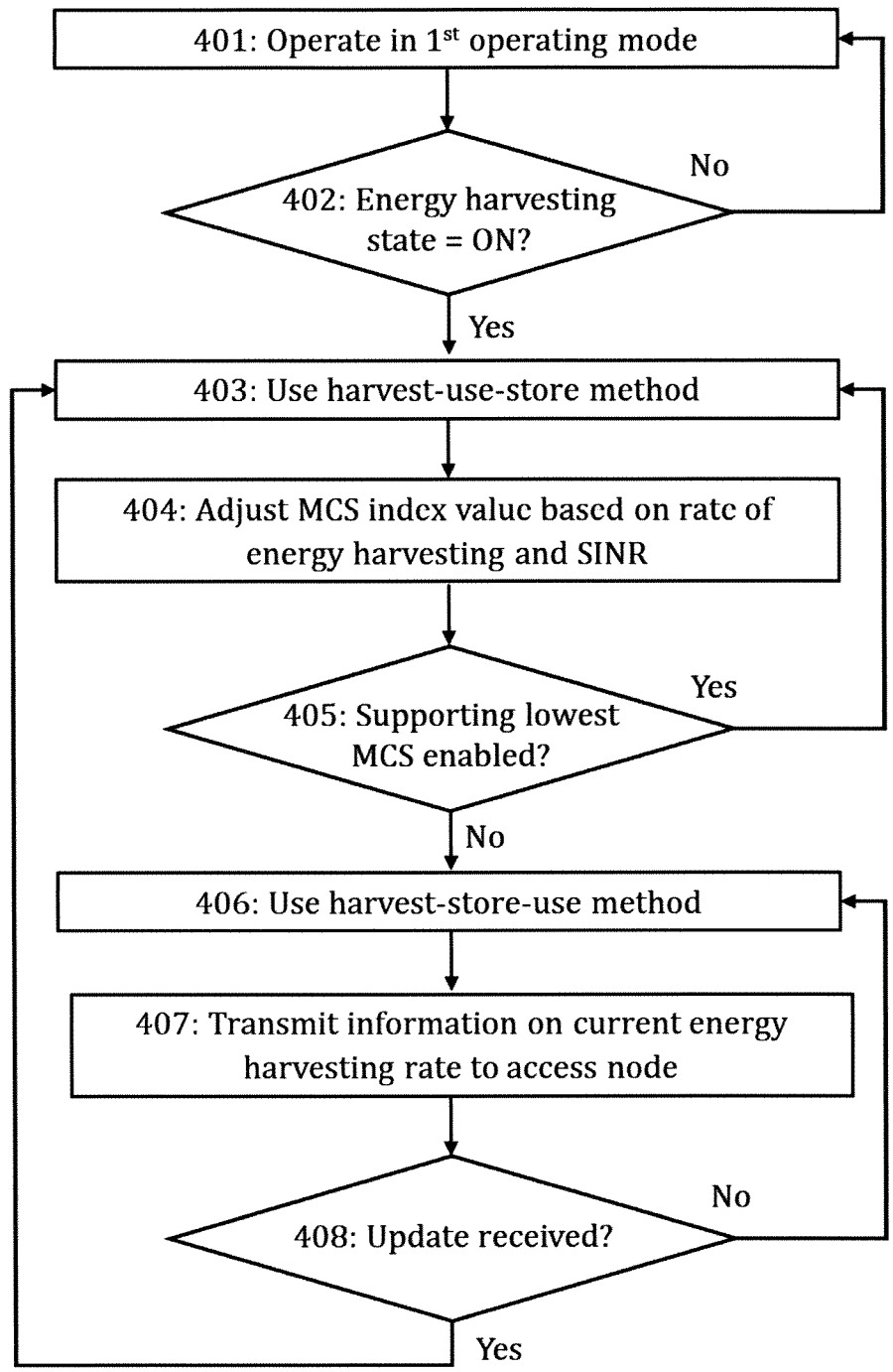
Figure 4B:
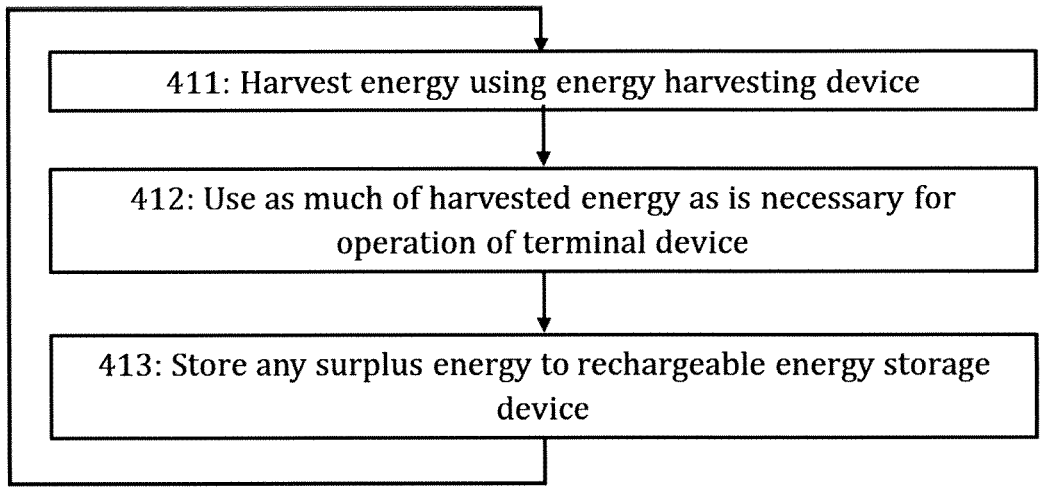
Figure 4C:
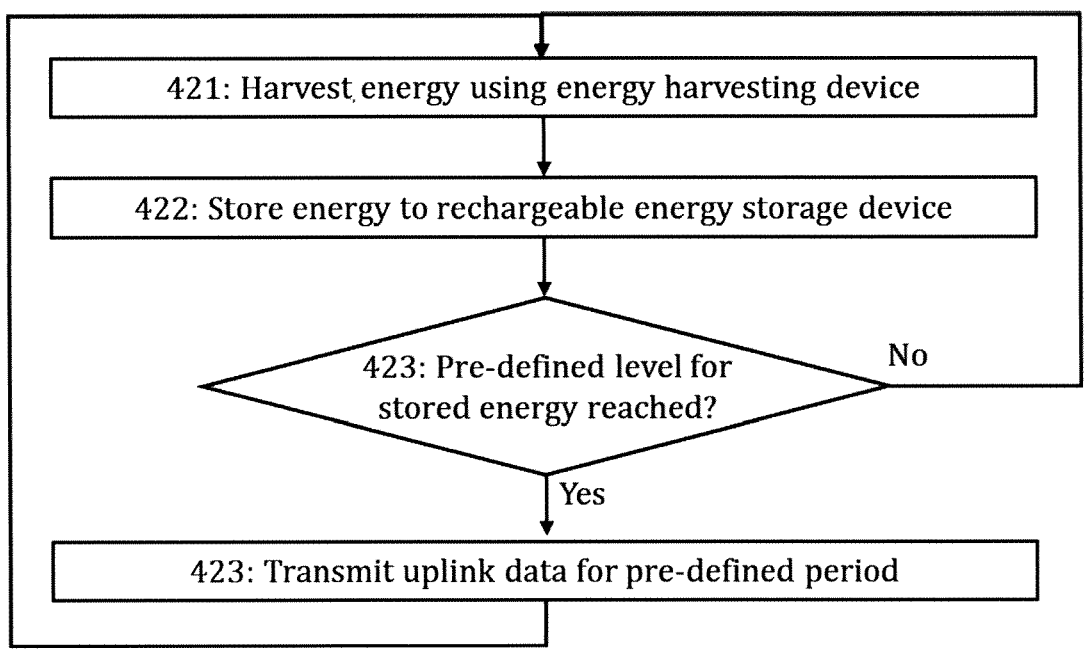

FIG. 4A illustrates another process according to embodiments for controlling operation of an energy-harvesting enabled terminal device. Specifically, FIG. 4A shows a flow chart for a process according to embodiments for operating the terminal device in the first operating mode as defined above, especially when energy is being harvested in parallel. Thus, the process of FIG. 4A may correspond to a more detailed presentation of block 304 of FIG. 3A. FIGS. 4B and 4C provide more detailed views of blocks 403 & 405 of FIG. 4A, respectively. The apparatus performing said process and the terminal device in which the apparatus is comprised may be defined as described in connection with FIGS. 2 and/or 3A.

Referring to FIG. 4A, the terminal device is assumed to operate, in block 401, in the first operating mode. The first operating mode may be defined as discussed above, i.e., it may provide the functions of receiving downlink data from at least one access node, performing sensing using said at least one sensor and transmitting uplink data to said at least one access node. The apparatus may operate in said first operating mode throughout the process of FIG. 4A.

In block 402, differentiation is made between operation in the first operating mode while the first energy harvesting state (i.e., the 'ON' state) is active and while the second energy harvesting state (i.e., the 'OFF' state) is active. If the second energy harvesting state is active (i.e., the energy stored to the rechargeable storage device is smaller than the energy consumed by the terminal device) in block 402, the operation in the first operating mode may be carried out also described in connection with FIG. 3.

If the first energy harvesting state is active (i.e., energy is harvested) in block 402, the apparatus may carry out various functions for optimizing the use of the harvested energy by the terminal device while operating in the first operating mode. By default, the apparatus may employ, in block 403, the so-called harvest-use-store method for the energy harvesting.

The harvest-use-store method as used in block 403 is illustrated in detail in FIG. 4B. The method comprises at least steps of: harvesting, in block 411, energy using the energy harvesting device, using, in block 412, (immediately) as much of the harvested energy as is necessary for the operation of the terminal device and storing, in block 413, any surplus energy to the rechargeable energy storage device (if any remains). This operation may be repeated continuously or periodically or regularly when using the harvest-use-store method as indicated by the arrow connecting block 413 back to block 411.

Compared to the commonly used harvest-store-use method (to be defined in detail in connection with block 405 and FIG. 4C), the harvest-use-store method has multiple benefits. Firstly, in rechargeable energy storage devices (e.g., batteries), there is always energy leakage when energy is stored. If the harvest-use-store method is used, this loss of energy over time is reduced as the captured energy is put to use directly and immediately without storing it to the rechargeable energy storage device. Secondly, as only the surplus energy is stored after making use of some of the harvested energy, the capacity of the energy storage device of the terminal device may be reduced. This is especially beneficial for RedCap terminal devices which are typically charged with solar energy sources. Using the harvest-use-store method, there is no need to store a lot of energy as more energy will be available for certain pre-defined period(s), typically for some hours within a span of 24 hours.

While operating using the harvest-use-store method, the apparatus adjusts, in block 404, a modulation and coding scheme (MCS) index value based at least on an energy harvesting rate and signal-to-interference-plus-noise ratio (SINR) of the received downlink data to optimize uplink transmissions. The energy harvesting rate and SINR for the terminal device may be continuously monitored by the apparatus (e.g., in block 302 of FIG. 3). The Modulation Coding Scheme (MCS) index is a well-known metric, the value of which depends on modulation type, coding rate, the number of spatial streams, the channel width and/or the guard interval. For performing the adjusting in block 404, the apparatus may maintain, in a memory, a MCS table mapping each set of energy harvesting rate value and SINR value (and optionally one or more other connection parameters) to a particular (highest supported) MCS index value.

If the current energy harvesting rate is too low to support the lowest MCS index value for the particular SINR in block 405 (based on said current energy harvesting rate and SINR), the apparatus switches, in block 406, to use a harvest-store-use method, instead of the harvest-use-store method, at least for uplink transmissions.

The harvest-store-use method as used in block 405 is illustrated in detail in FIG. 4C. The harvest-store-use method may comprise here specifically: harvesting, in block 421, energy using the energy harvesting device, storing, in block 422, energy to the rechargeable energy storage device and in response to energy stored in the rechargeable energy storage device reaching a pre-defined level for supporting at least the lowest MCS index value for said pre-defined period in block 423, transmitting, in block 424, uplink data (comprising information on results of the sensing) for a pre-defined period (using said lowest MCS index value). This operation may be repeated continuously or periodically or regularly when using the harvest-store-use method as indicated by the arrow connecting block 424 back to block 211.

The functionalities of the first operating mode other than the uplink transmission such as sensing or reception of downlink transmissions (which typically require considerably less energy compared uplink transmissions) may be carried out still using the harvest-use-store-type methodology discussed above, that is, harvested energy may be used directly for these functions without waiting for the stored energy to reach a pre-defined level in block 423.

The apparatus transmits, in block 407, information on a current energy harvesting rate to an access node. In some embodiments, information on current SINR as measured by the terminal device and/or a current charge level or a current charge state may also be transmitted. The charge state may be defined to have three possible values corresponding to the charge level being equal to or below the second threshold, above the second threshold but equal to or below the first threshold or above the second threshold. Thus, the charge state enables providing information on the charge status in a more compact (2-bit) form compared to the current charge level. The transmitting of said information may be carried out periodically or in intervals (lengths of which may vary). The transmitting of said information may form a part of the step 3) of the harvest-store-use method discussed above. In some embodiments, the access node may relay said information further to the application server. Based on the provided information, the access node or the application server may decide whether or not the terminal device should switch back to using the harvest-use-store method.

In response to receiving from the access node a (control) message (or specifically an EH use mode update message) for switching back to the harvest-use-store method in block 408, the apparatus switches back to using the harvest-use-store method (i.e., the process proceeds back to block 403). The access node may simply relay the EH use mode update message received from the application server to the terminal device.

In other embodiments, the harvest-store-use method may be the default method used, instead of the harvest-use-store method. In such embodiments, the terminal device may also initially have to request permission to use the harvest-use-store method, as described in connection with FIG. 5A. In other words, the operation of the process of FIG. 4A may effectively start, in such embodiments, with blocks 401, 402 (yes) and 406 and then proceed as depicted in FIG. 4A.

Figure 5A:
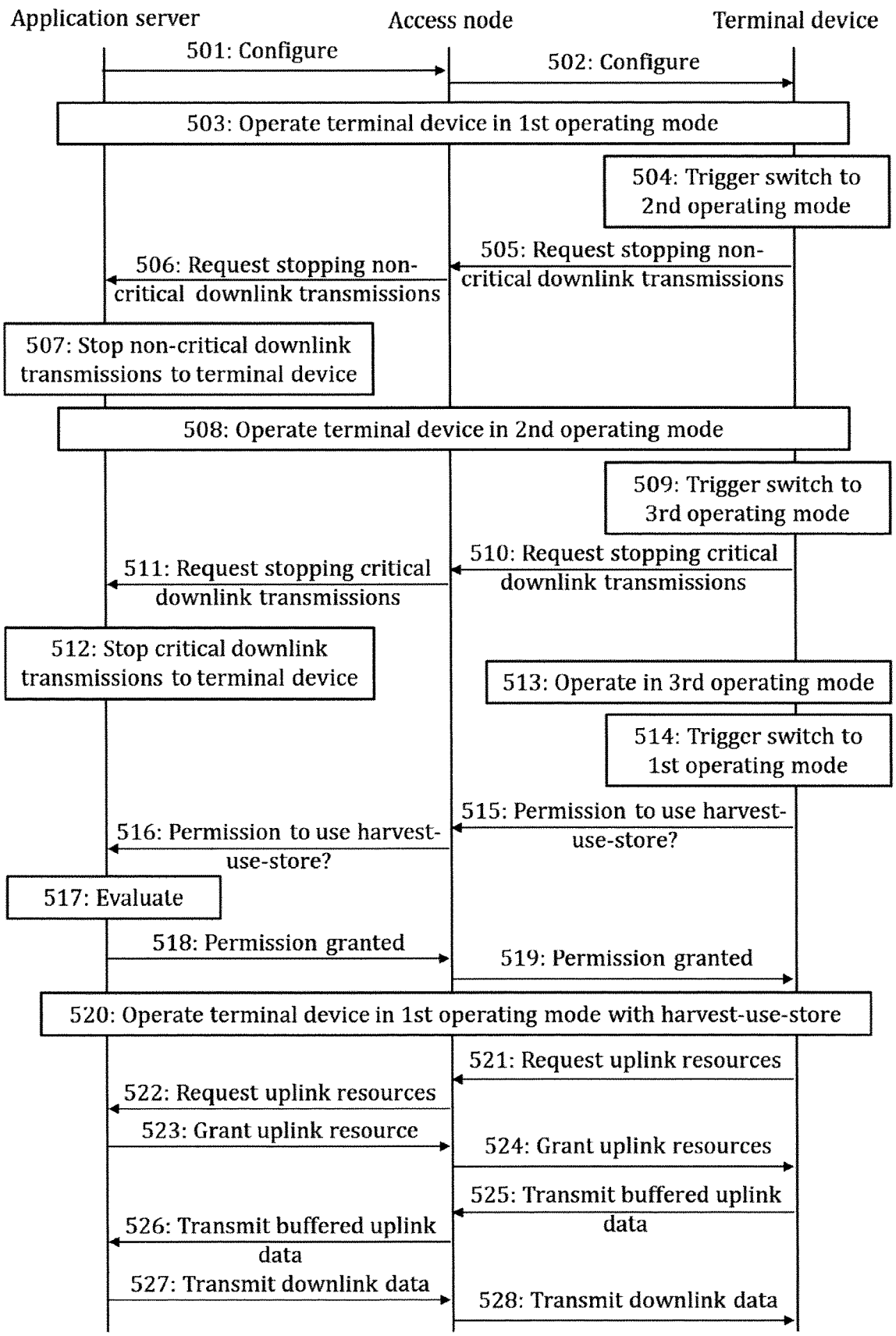
FIGS. 5A, 5B and 6 illustrate signaling between a terminal device, an access node and an application server according to embodiments.

FIG. 5A illustrates signaling between an application server connected to or comprised in a core network, an access node serving a terminal device and said terminal device according to embodiments. The application server, the access node and the terminal device may correspond to the application server 221, the access node 211 and the terminal device 201 of FIG. 2, respectively. FIG. 5A corresponds specifically to a terminal device-driven implementation of the embodiments, where the method according to embodiments (as described above in connection with FIGS. 3A, 3B, 3C, 3D, 4A, 4B and 4C) resides predominantly at the terminal device and all the charge levels and energy harvesting states are known to the terminal device. In such implementations, it is the terminal device which decides on any particular actions regarding enabling uplink data transmission or downlink data reception and informs the access node and the application server accordingly.

Referring to FIG. 5A, the application server initially configures, in messages 501, 502, via the access node, to the terminal device first and second thresholds for a charge level of a rechargeable energy storage device of the terminal device. Similar to previous embodiments, the second threshold is assumed to be lower than the first threshold.

Following the configuration, the terminal device may initially operate, in block 503, in a first operating mode, similar to as discussed in connection with block 304 of FIG. 3A and FIG. 3B. The terminal device may monitor a current charge level of the rechargeable energy storage device and a current energy harvesting state of the energy harvesting device of the terminal device (not shown in FIG. 5).

After some time, a switch from the first operating mode to the second operating mode is triggered in block 504. As in previous embodiments, the switch from the first operating mode to the second operating mode may be specifically triggered when the current energy harvesting state corresponds to the second energy harvesting state (i.e., 'OFF state') and the current charge level is equal to or lower than the first threshold but higher than the second threshold (i.e., the charge level is low but not below a critical level). Any uplink data which cannot be transmitted during the second operating mode may be buffered for later uplink transmission.

In response to the triggering in block 504, the terminal device transmits, in message 505, to the access node, a request (i.e., a control message) for stopping transmitting non-critical downlink data to the terminal device. Upon receiving the request, the access node may relay, in message 506, said request to the application server. Consequently, the application server and/or the access node may be configured to seize non-critical downlink transmissions to the terminal device. Any scheduled non-critical downlink transmissions may be buffered, in the application server or the access node, for later transmission. By minimizing the downlink transmissions, the energy consumption of the terminal device may be minimized while still enabling reception of (rare) critical downlink messages in the terminal device.

Thereafter, the terminal device operates, in block 508, in the second operating mode, similar to as discussed in connection with block 307 of FIG. 3A and FIG. 3C though with the additional condition of limiting downlink transmission to few critical messages. After some time, a switch from the second operating mode to the third operating mode is triggered in block 509. As in previous embodiments, the switch from the second operating mode to the third operating mode may be specifically triggered when the current energy harvesting state corresponds to the second energy harvesting state (i.e., 'OFF' state) and the current charge level is equal to or lower than the second threshold (i.e., the charge level is below a critical level).

In response to the triggering in block 509, the terminal device transmits, in message 510, to the access node, a request for stopping transmitting also critical downlink data to the terminal device (i.e., for effectively stopping all downlink transmissions). Upon receiving the request, the access node may relay, in message 511, said request to the application server. Consequently, the application server and/or the access node may be configured to seize also critical downlink transmissions to the terminal device. Any scheduled non-critical as well as critical downlink transmissions may be buffered, in the application server or the access node, for later transmission from thereon.

The terminal device operates, in block 513, in the third operating mode, similar to as discussed in connection with block 308 of FIG. 3A and FIG. 3D. As in previous embodiments, in the third operating mode, the first terminal device merely performs sensing using at least one sensor (or, in general, one or more non-communication actions) without receiving or transmitting any data. Any uplink data is buffered for later uplink transmission.

After some time, a switch back to the first operating mode is triggered in block 514. In this exemplary embodiment, the terminal device operates, by default following the switching back to the first operating mode in block 514, using the harvest-store-use method. The terminal device requests, in message 515, permission from the application server to operate using the harvest-use-store method, instead of the harvest-store-use method, so as to reduce energy drain due to the energy being unnecessarily being stored in the rechargeable energy storage device. The message 515 may comprise information on the current energy harvesting rate and the current charge level or state. In some case, the message 515 may also comprise a current SINR, if not previously communicated as a part of channel state information (CSI) reporting procedure. The access node relays, in message 516, the request for permission to use the harvest-use-store method (and the information contained therein) to the application server. The application server evaluates, in block 517, received information to determine whether the terminal device can be allowed to switch to using harvest-use-store method. The application server may evaluate, for example, whether the current energy harvesting rate is large enough to support the lowest MCS index value for the particular SINR (based on said current energy harvesting rate and SINR). In this example, the permission to the use the harvest-use-store method is granted by the application server and communicated, in messages 518, 519, via the access node to the terminal device. Subsequently, the terminal device may operate, in block 520, in the first operating mode using the harvest-use-store method.

During its operation in the second operating mode in block 508 and/or in the third operating mode in block 513, the terminal device buffers any uplink data which cannot be transmitted to the access node due to the uplink transmission functionality being disabled. In this example, it is assumed that some uplink data has to be buffered in blocks 508 and/or 513. To enable transmission of the buffered uplink data when the terminal device switches back to the first operating mode, the terminal device requests, in messages 521, 522, scheduling of uplink time-frequency resources from the access node and the application server. Messages 521, 522 serve also as an implicit trigger for enabling the transmitting of downlink data from the application server and/or the access node to the terminal device. The request uplink time-frequency resources are granted via messages 523, 524. Thereafter, the terminal device is able to both transmit, in message 525, the buffered uplink data to the access node which forwards said data, in message 526, further to the application server and to receive downlink data transmitted, in messages 527, 528, by the application server via the access node to the terminal device. The downlink data may also correspond here specifically (at least in part) to downlink data which had to be buffered while the terminal device was operating in the second and/or third operating mode.

Figure 5B:
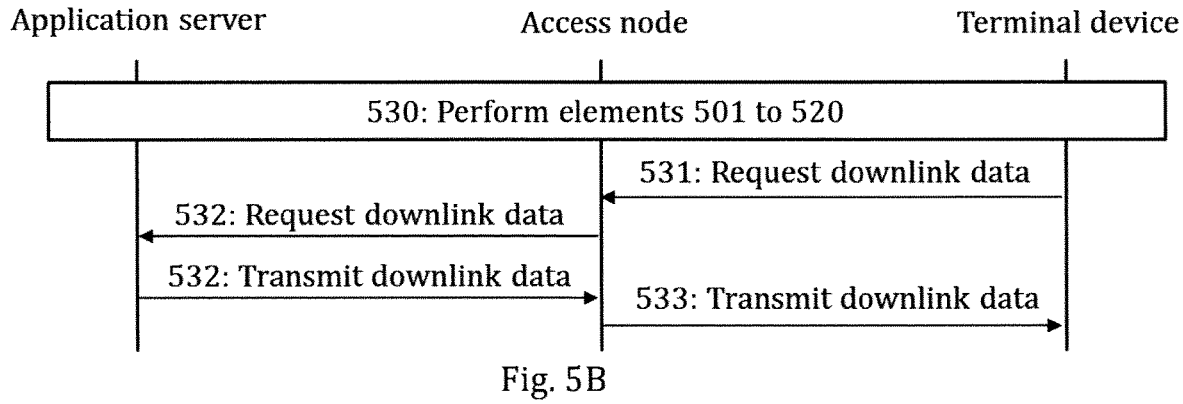

FIG. 5B illustrates a minor variation to the process of FIG. 5A. Unless otherwise explicitly stated the definitions provided in connection with FIG. 5A apply, mutatis mutandis, also here. Specifically, the initial processes and signalling as discussed in connection with elements 501 to 520 are assumed to be performed in block 530 of FIG. 5B. However, while in FIG. 5A it was assumed that the terminal device had to buffer uplink data when it was operating in the second and/or third operating modes (blocks 508 and/or 513), in this case, it is assumed that no uplink data is buffered. In FIG. 5A, the request for scheduling uplink time-frequency resources for scheduling the buffered uplink data (messages 521, 522) had the secondary function of informing the application server that the terminal device is ready to receive downlink data. As no such request needs to be transmitted in this case, the terminal device transmits, in message 531, an explicit (control) message or request for (buffered) downlink data to the access node which forwards, in message 532, said request further to the application server. Thereafter, the application server is able to transmit, in messages 533, 534, downlink data (or specifically buffered downlink data) via the access node to the terminal device, similar to messages 525, 526 of FIG. 5A. The request 531 may be, e.g., a previously configured random access preamble.

Multiple different (independent) functionalities were illustrated in and discussed in connection with FIGS. 5A and 5B. It should be noted that all of said functionalities need not be included in a given embodiment, but may be freely separated from each other.

Figure 6:
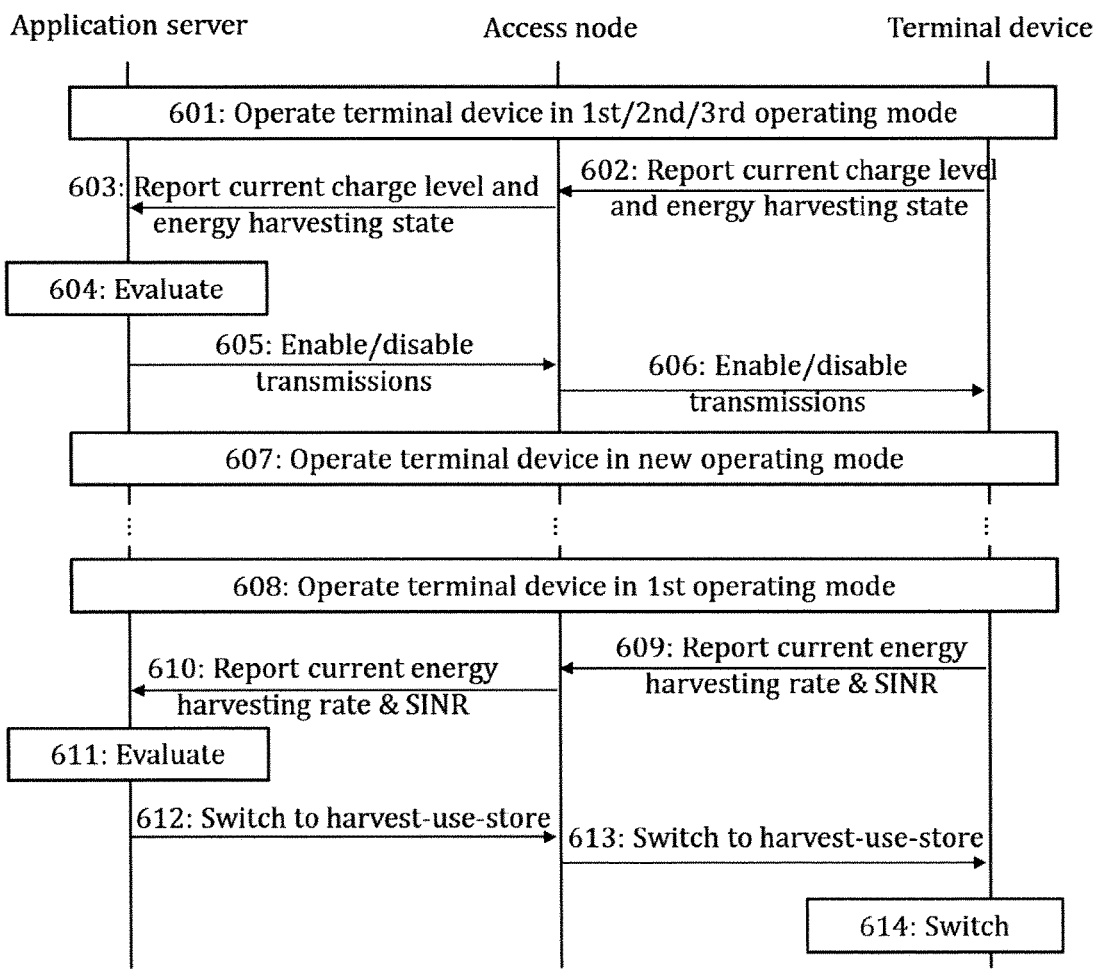

FIG. 6 also illustrates signaling between an application server connected to or comprised in a core network, an access node serving a terminal device and said terminal device according to embodiments. The application server, the access node and the terminal device may correspond to the application server 221, the access node 211 and the terminal device 201 of FIG. 2, respectively. FIG. 6 corresponds specifically to a network driven or more specifically an application server driven implementation of the embodiments, where the method according to embodiments (as described above in connection with FIGS. 3 and 4) resides at the application server and all the charge levels and energy harvesting states are known also to the application server for enabling remote control of the terminal device. In such implementations, it is the application server which ultimately decides on any particular actions regarding enabling uplink data transmission or downlink data reception and commands the terminal device to operate accordingly. In other words, it is the application server (not the terminal device) which is configured to implement, in this case, the method of FIG. 4A.

Referring to FIG. 6, the terminal device is assumed to operate, in block 601, in one of the first, second and third operating modes. The terminal device transmits, in message 602, information on current charge level and the current energy harvesting state as a control message to the access node. In general, the terminal device may be configured to perform such transmissions periodically or regularly, regardless of the current operating mode. Said information is forwarded by the access node to the application server in message 603. The application server evaluates, in block 604, the received information to determine whether switching of operating mode should be carried out (i.e., whether to enable/disable uplink/downlink data transmission from/to the terminal device). This evaluation may be performed as discussed in connection with FIG. 3A (namely, in connection with blocks 303, 305, 306 of FIG. 3A).

In this example, it is assumed that the application server decides that the terminal device should switch its operating mode (i.e., uplink or downlink data transmission for the terminal device should be enabled or disabled) and thus transmits, in message 605, a request (i.e., a control message) for switching the operating mode (i.e., for enabling or disabling uplink or downlink transmissions for the terminal device) to the access node. For example, if downlink transmissions by the access node are to be disabled, the access node stops downlink transmissions (and possibly buffers them instead) until new information on the current charge level and the current energy harvesting state (implying a need for switching operating modes) is received. The access node transmits, in message 606, a corresponding request (i.e., a control message) to the terminal device. Upon receiving the request, the terminal device starts operating, in block 607, in the operating mode defined in the request.

The application server may decide not only which operating mode should be used by the terminal device but also whether the terminal device should operate using the harvest-use-store or harvest-store-use method. This functionality is illustrated with elements 608 to 614. Similar to as discussed in above embodiments, the terminal device employs said energy harvesting methods when operating specifically in the first operating mode and in the first energy harvesting state indicative of energy being harvested. Accordingly, it is assumed that the terminal device operates, in block 608, in the first operating mode. The terminal device may be specifically operating using the harvest-store-use method. In general, the terminal device may operate, by default, using either of the harvest-use-store and harvest-store-use methods.

The terminal device reports, in message(s) 609, its current energy harvesting rate and SINR of downlink data received by it to the access node. The reporting of the SINR may be a part of the typical channel state information (CSI) reporting functionality of the terminal device. The access node forwards, in message 610, said information to the application server.

The application server evaluates, in block 611, the received information. This evaluation may be carried out in a similar manner as discussed in connection with above embodiments (namely, FIGS. 4A and 5A). Thus, the application server may determine, in block 612, whether the current energy harvesting rate is too low to support lowest MCS index value for the SINR based on the current energy harvesting rate and the SINR. If this is the case, the application server may determine, in block 612, that the terminal device should operate using the harvest-store-use method. If this is not the case, the application server may determine, in block 612, that the terminal device should operate using the harvest-use-store method. If the energy harvesting mode used currently by the terminal device deviates from the one determined in block 612, the application server may transmit a control message for changing the energy harvesting mode. In some embodiments, a control message may be transmitted in any case (even if there would be no change to the energy harvesting mode).

In the illustrated example, it is assumed that the application server determines, in block 612, that the terminal device, which is currently operating using the harvest-store-use method, should operate, instead, using the harvest-use-store method. Thus, the application server transmits, in message 613, to the access node a control message for using the harvest-store-use method. The access node forwards, in message 614, to the terminal device. Upon receiving the control message, the terminal device switches from using the harvest-store-use method to using harvest-use-store method.

The functionalities described in connection with elements 521 to 524 may be equally implemented for the application server-based implementation.

Similar to as described for terminal device-driven embodiments, the application server may, in some embodiments, monitor time since last uplink transmission of pre-defined critical data and, in response to said time since last uplink transmission exceeding a pre-defined limit, cause the terminal device (by transmitting a corresponding control message via an access node to the terminal device) to transmit critical uplink data regardless of current operating mode.

Figure 7:
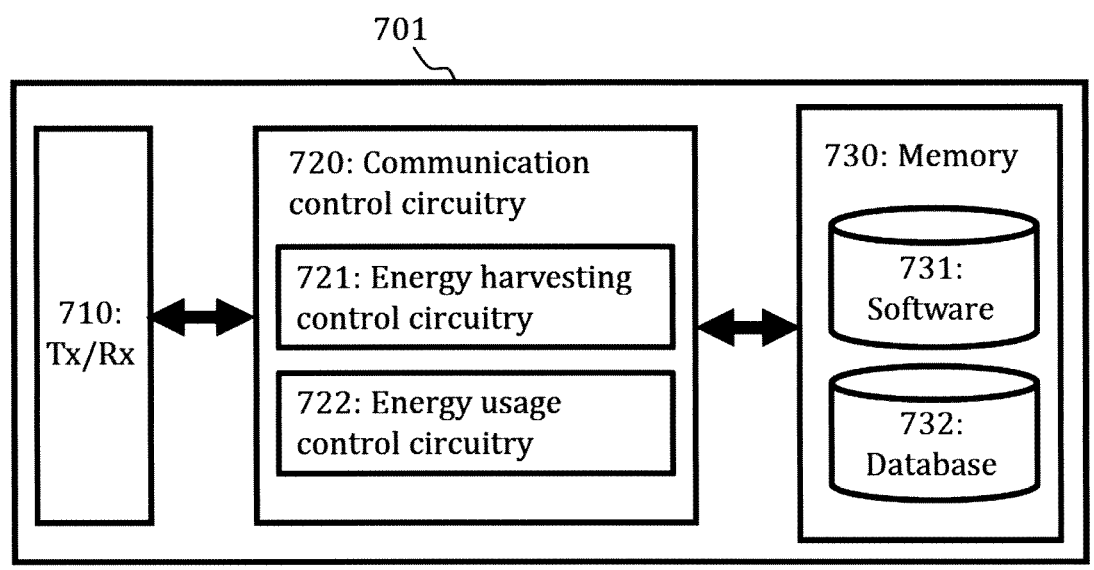
FIG. 7 illustrates an exemplary apparatus according to embodiments.

FIG. 7 illustrates an exemplary apparatus 701 configured to carry out at least the functions described above in connection with at least some of the processes illustrated in FIGS. 3A, 3B, 3C, 3D, 4A, 4B, 4C, 5A, 5B and 6. The apparatus may be an electronic device comprising electronic circuitries. The apparatus may be a separate entity or a plurality of separate entities. Specifically, the apparatus may be or be comprised in a terminal device (or specifically an energy harvesting capable RedCap terminal device). Alternatively, the apparatus may be or be comprised in an application server communicatively connected to a terminal device via at least one access node.

The apparatus may comprise a communication control circuitry 710 such as at least one processor, and at least one memory 730 including a computer program code (software) 731 wherein the at least one memory and the computer program code (software) are configured, with the at least one processor, to cause the apparatus to carry out any one of the embodiments of an apparatus for a terminal device or a terminal device or an application server for controlling a terminal device described above.

The memory 730 may be implemented using any suitable data storage technology, such as semiconductor based memory devices, flash memory, magnetic memory devices and systems, optical memory devices and systems, fixed memory and removable memory. The memory may comprise a database 732 which may be or comprise the database as described in relation to previous embodiments. The memory 730 may be connected to the communication control circuitry 720 via an interface.

The apparatus may further comprise interfaces 710 comprising hardware and/or software for realizing connectivity according to one or more communication protocols. The interfaces 710 may comprise, for example, interfaces enabling the connections between the apparatus 701 and other apparatuses. The interfaces 710 may provide the apparatus with communication capabilities to communicate in the cellular communication system and enable communication with network nodes (e.g., access nodes), terminal devices and one or more core network nodes, for example. When the apparatus 701 is comprised in the terminal device, the interfaces 710 may provide a connection to an energy harvesting device, a rechargeable energy storage device and/or at least one sensor of said terminal device. When the apparatus 701 is an application server, the interfaces 710 may provide a connection to at least one access node which is communicatively connected to at least one terminal device. The interfaces 710 may comprise standard well-known components such as an amplifier, filter, frequency-converter, (de)modulator, and encoder/decoder circuitries and one or more antennas (in some embodiments, specifically an antenna array comprising a plurality of antenna elements).

Referring to FIG. 7, the communication control circuitry 720 may comprise energy harvesting control circuitry 721 configured to perform energy harvesting in communication with an energy harvesting device and a rechargeable energy storage device of a terminal device or cause remotely the performing of the energy harvesting of the terminal device according to any of embodiments illustrated in FIGS. 3A, 3B, 3C, 3D, 4A, 4B, 4C, 5A, 5B and 6. The communication control circuitry 720 may further comprise energy usage control circuitry 722 configured to perform sensing (and/or other one or more non-communication functions), uplink transmission, downlink reception and other energy consuming functions and decision-making relating thereto or cause remotely the performing of said functionalities of the terminal device according to any of embodiments illustrated in FIGS. 3A, 3B, 3C, 3D, 4A, 4B, 4C, 5A, 5B and 6.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

In an embodiment, at least some of the processes described in connection with FIGS. 3A, 3B, 3C, 3D, 4A, 4B, 4C, 5A, 5B and 6 may be carried out by an apparatus comprising corresponding means for carrying out at least some of the described processes. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry. In an embodiment, the at least one processor, the memory, and the computer program code form processing means or comprises one or more computer program code portions for carrying out one or more operations according to any one of the embodiments of FIGS. 3A, 3B, 3C, 3D, 4A, 4B, 4C, 5A, 5B and 6 or operations thereof.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chipset (procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

According to an aspect, there is provided an apparatus for controlling a terminal device comprising a rechargeable energy storage device and an energy harvesting device for charging the rechargeable energy storage device, the apparatus comprising means for performing:

monitoring a current charge level of the rechargeable energy storage device and a current energy harvesting state of the energy harvesting device;

when the current energy harvesting state corresponds to a first energy harvesting state indicative of energy being harvested to the rechargeable energy storage or when the current energy harvesting state corresponds to a second energy harvesting state indicative of no energy being harvested to the rechargeable energy storage device and the current charge level is higher than a first threshold, causing the terminal device to operate in a first operating mode comprising at least functions of: receiving downlink data from an access node, performing one or more non-communication actions and transmitting uplink data to said access node;

when the current energy harvesting state corresponds to the second energy harvesting state and the current charge level is equal to or lower than the first threshold but higher than a second threshold, causing the terminal device to operate in a second operating mode, wherein the second operating mode corresponds to the first operating mode with one of its functions disabled; and when the current energy harvesting state corresponds to the second energy harvesting state and the current charge level is equal to or lower than the second threshold, causing the terminal device to operate in a third operating mode, wherein the third operating mode corresponds to the second operating mode with at least one further function disabled.

According to an aspect, there is provided an apparatus for a terminal device, the apparatus comprising means for performing any of the embodiments of the methods described in connection with any of FIGS. 3A, 3B, 3C, 3D, 4A, 4B, 4C, 5A, 5B and 6.

Embodiments as described may also be carried out in the form of a computer process defined by a computer program or portions thereof. Embodiments of the methods described in connection with FIGS. 3A, 3B, 3C, 3D, 4A, 4B, 4C, 5A, 5B and 6 may be carried out by executing at least one portion of a computer program comprising corresponding instructions. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium. Coding of software for carrying out the embodiments as shown and described is well within the scope of a person of ordinary skill in the art.

According to an embodiment, there is provided a computer program comprising instructions for causing an apparatus to perform any of the embodiments of the methods described in connection with any of FIGS. 3A, 3B, 3C, 3D, 4A, 4B, 4C, 5A, 5B and 6.

According to an embodiment, there is provided a computer readable medium comprising program instructions for causing an apparatus to perform any of the embodiments of the methods described in connection with any of FIGS. 3A, 3B, 3C, 3D, 4A, 4B, 4C, 5A, 5B and 6.

According to an embodiment, there is provided a non-transitory computer readable medium comprising program instructions for causing an apparatus to perform any of the embodiments of the methods described in connection with any of FIGS. 3A, 3B, 3C, 3D, 4A, 4B, 4C, 5A, 5B and 6.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. An apparatus for controlling a terminal device comprising a rechargeable energy storage device, an energy harvesting device for charging the rechargeable energy storage device and at least one sensor, the apparatus comprising:
    at least one processor; and
    at least one memory including computer program code, the at least one memory and computer program code configured to, with the at least one processor, cause the apparatus to perform:
        monitoring a current charge level of the rechargeable energy storage device and a current energy harvesting state of the energy harvesting device;

upon the current energy harvesting state corresponding to a first energy harvesting state indicative of energy being harvested to the rechargeable energy storage or upon the current energy harvesting state corresponding to a second energy harvesting state indicative of no energy being harvested to the rechargeable energy storage device and the current charge level is higher than a first threshold, causing the terminal device to operate in a first operating mode comprising at least functions of: receiving downlink data from an access node, performing one or more non-communication actions and transmitting uplink data to said access node, wherein the performing of the one or more non-communication actions comprises at least performing sensing using said at least one sensor;

upon the current energy harvesting state corresponding to the second energy harvesting state and the current charge level is equal to or lower than the first threshold but higher than a second threshold, causing the terminal device to operate in a second operating mode, wherein the second operating mode corresponds to the first operating mode with uplink data transmission disabled; and upon the current energy harvesting state corresponding to the second energy harvesting state and the current charge level is equal to or lower than the second threshold, causing the terminal device to operate in a third operating mode, wherein the third operating mode corresponds to the second operating mode with downlink data reception disabled.

2. The apparatus according to claim 1, wherein the receiving of downlink data in the second operating mode is limited to pre-defined critical downlink data.

3. The apparatus according to claim 1, wherein the at least one memory and the computer program code are configured, with the at least one processor, to cause the apparatus to perform:
   monitoring time since last uplink transmission of pre-defined critical data; and
   in response to said time since last uplink transmission exceeding a pre-defined limit, causing the terminal device to transmit critical uplink data regardless of current operating mode.

4. The apparatus according to claim 1, wherein the apparatus is comprised in the terminal device.

5. The apparatus of claim 4, wherein the at least one memory and the computer program code are configured, with the at least one processor, to cause the apparatus to perform:
   buffering uplink data transmissions when operating using the second or third operating mode; and
   prioritizing any buffered uplink data transmissions when operating using the first operating mode.

6. The apparatus according to claim 4, wherein the at least one memory and the computer program code are configured, with the at least one processor, to cause the apparatus to perform, upon the current energy harvesting state corresponding to the first energy harvesting state:
   adjusting modulation and coding scheme, MCS, index value based on a rate of energy harvesting and signal-to-interference-plus-noise ratio, SINR, of the received downlink data to optimize uplink transmissions.

7. The apparatus according to claim 4, wherein the at least one memory and the computer program code are configured, with the at least one processor, to cause the apparatus to perform:
   upon the current energy harvesting state corresponding to the first energy harvesting state indicative of energy being harvested to the rechargeable energy storage device, operating the terminal device according to a harvest-use-store method or a harvest-store-use method, wherein the harvest-use-store method comprises
      harvesting energy using the energy harvesting device, using as much of the harvested energy as is necessary for the operation of the terminal device and
      storing any surplus energy to the rechargeable energy storage device and
   the harvest-store-use method comprises
      harvesting energy using the energy harvesting device, storing energy to the rechargeable energy storage device; and
      transmitting uplink data for a pre-defined period in response to energy stored in the rechargeable energy storage device reaching a level for supporting at least lowest MCS index value for said pre-defined period.

8. The apparatus according to claim 7, wherein the at least one memory and the computer program code are configured, with the at least one processor, to cause the apparatus to perform, upon the current energy harvesting state corresponding to the first energy harvesting state and the terminal device operates according to the harvest-use-store method:
   in response to energy harvesting rate being too low to support lowest MCS index value for a current SINR, switching from the harvest-use-store method to the harvest-store-use method.

9. The apparatus according to claim 8, wherein the at least one memory and the computer program code are configured, with the at least one processor, to cause the apparatus to perform, upon the current energy harvesting state corresponding to the first energy harvesting state and the terminal device operates according to the harvest-store-use method:
   transmitting information on a current energy harvesting rate and a current SINR to said access node; and
   in response to receiving from the access node a message for switching to the harvest-use-store method, switching to the harvest-use-store method.

10. The apparatus according to claim 4, wherein the at least one memory and the computer program code are configured, with the at least one processor, to cause the apparatus to perform:
   in response to a change of the current operating mode from the third operating mode to the first operating mode due to the current energy harvesting state changing from the second energy harvesting state to the first energy harvesting state, transmitting, to said access node, a first request for downlink data to the access node if no uplink data was buffered during past operation in the third operating mode; and/or
   in response to a change of the current operating mode from the third operating mode to the first operating mode due to the current energy harvesting state changing from the second energy harvesting state to the first energy harvesting state, transmitting, to said access node, a second request for scheduling of time-frequency uplink resources for transmitting the buffered uplink data if uplink data was buffered during past operation in the third operating mode, wherein the second request acts as an implicit trigger for transmission of downlink data.

11. The apparatus according to claim 10, wherein the first request is a previously configured random access preamble.

12. The apparatus according to claim 4, wherein the at least one memory and the computer program code are configured, with the at least one processor, to cause the apparatus to perform, upon the current energy harvesting state corresponding to the second energy harvesting state indicative of no energy being harvested to the rechargeable energy storage device and the current charge level is higher than the first threshold:
  performing the transmitting of the uplink data using a connection initiated through a random access procedure, using an early data transmission procedure or in previously configured resources for grant-free transmissions.

13. The apparatus according to claim 4, wherein the at least one memory and the computer program code are configured, with the at least one processor, to cause the apparatus to perform:
  in response to triggering operation in the second operating mode, transmitting, to the access node, a first request for stopping non-critical downlink transmissions to the terminal device before starting the operating in the second operating mode; and/or
  in response to triggering operation in the third operating mode, transmitting, to the access node, a second request for stopping all downlink transmissions to the terminal device before starting the operating in the third operating mode.

14. The apparatus according to claim 13, wherein the first and/or second request is a Radio Resource Control, RRC, message or an uplink control message.

15. The apparatus according to claim 1, wherein the apparatus is an application server communicatively connected to the terminal device via at least one access node and the at least one memory and the computer program code are configured, with the at least one processor, to cause the apparatus to
  perform the monitoring by receiving at least one control message comprising the current charge level and the current energy harvesting state from the terminal device via the access node and
  cause the terminal device to operate in a particular operating mode by transmitting at least one control message for requesting a change of an operating mode via the access node to the terminal device.

16. The apparatus according to claim 15, wherein the at least one memory and the computer program code are configured, with the at least one processor, to cause the apparatus to perform:
  receiving information on a current energy harvesting rate of the terminal device and a signal-to-interference-plus-noise ratio, SINR, of downlink data received by the terminal device from the terminal device via the access node; and
  if the current energy harvesting rate is too low to support lowest MCS index value for the SINR and the terminal device is currently operating using a harvest-use-store method, transmitting, to the terminal device via the access node, a control message for using a harvest-store-use method, wherein the harvest-store-use method comprises:
    harvesting energy using the energy harvesting device, storing energy to the rechargeable energy storage device and
    transmitting uplink data for a pre-defined period in response to energy stored in the rechargeable energy storage device reaching a level for supporting at least lowest MCS index value for said pre-defined period and
  the harvest-use-store method comprises:
    harvesting energy using the energy harvesting device, using as much of the harvested energy as is necessary for the operation of the terminal device and
    storing any surplus energy to the rechargeable energy storage device; and
  if the current energy harvesting rate is enough for supporting lowest MCS index value for the SINR and the terminal device is currently operating using the harvest-store-use method, transmitting, to the terminal device via the access node, a control message for using the harvest-use-store method.

17. A method comprising:
  monitoring a current charge level of a rechargeable energy storage device of a terminal device and a current energy harvesting state of an energy harvesting device of the terminal device;
  upon the current energy harvesting state corresponding to a first energy harvesting state indicative of energy being harvested to the rechargeable energy storage or upon the current energy harvesting state corresponding to a second energy harvesting state indicative of no energy being harvested to the rechargeable energy storage device and the current charge level is higher than a first threshold, causing the terminal device to operate in a first operating mode comprising at least functions of: receiving downlink data from an access node, performing one or more non-communication actions and transmitting uplink data to said access node, wherein the performing of the one or more non-communication actions comprises at least performing sensing using at least one sensor of the terminal device;
  upon the current energy harvesting state corresponding to the second energy harvesting state and the current charge level is equal to or lower than the first threshold but higher than a second threshold, causing the terminal device to operate in a second operating mode, wherein the second operating mode corresponds to the first operating mode with uplink data transmission disabled; and
  upon the current energy harvesting state corresponding to the second energy harvesting state and the current charge level is equal to or lower than the second threshold, causing the terminal device to operate in a third operating mode, wherein the third operating mode corresponds to the second operating mode with downlink data reception disabled.

18. A non-transitory computer readable medium comprising computer program instructions, the computer program instructions, when executed by an apparatus, causing the apparatus to perform at least the following:
  monitoring a current charge level of a rechargeable energy storage device of a terminal device and a current energy harvesting state of an energy harvesting device of the terminal device;
  upon the current energy harvesting state corresponding to a first energy harvesting state indicative of energy being harvested to the rechargeable energy storage or upon the current energy harvesting state corresponding to a second energy harvesting state indicative of no energy being harvested to the rechargeable energy storage device and the current charge level is higher than a first threshold, causing the terminal device to operate in a first operating mode comprising at least functions of:

receiving downlink data from an access node, performing one or more non-communication actions and transmitting uplink data to said access node, wherein the performing of the one or more non-communication actions comprises at least performing sensing using at least one sensor of the terminal device;

upon the current energy harvesting state corresponding to the second energy harvesting state and the current charge level is equal to or lower than the first threshold but higher than a second threshold, causing the terminal device to operate in a second operating mode, wherein the second operating mode corresponds to the first operating mode with uplink data transmission disabled; and upon the current energy harvesting state corresponding to the second energy harvesting state and the current charge level is equal to or lower than the second threshold, causing the terminal device to operate in a third operating mode, wherein the third operating mode corresponds to the second operating mode with downlink data reception disabled.

* * * * *